US007855973B2

(12) United States Patent
Bloebaum (10) Patent No.: US 7,855,973 B2
(45) Date of Patent: Dec. 21, 2010

(54) APPARATUS, METHODS AND COMPUTER PROGRAM PRODUCTS FOR TRANSMISSION OF DATA OVER AN ADJUSTABLE SYNCHRONOUS RADIO CHANNEL (75) Inventor: Leland Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1841 days.

(21) Appl. No.: 10/890,607

(22) Filed: Jul. 14, 2004

(65) Prior Publication Data
US 2006/0013130 A1 Jan. 19, 2006

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)
H04J 3/22 (2006.01)
H04W 4/00 (2009.01)

(52) U.S. Cl. ........................ 370/252; 370/329; 370/338; 370/468

(58) Field of Classification Search ................. 370/252, 370/254, 465, 468, 329, 338
See application file for complete search history.

(56) References Cited

U.S. PATENT DOCUMENTS 5,566,174 A * 10/1996 Sato et al. .................... 370/468
6,205,129 B1 * 3/2001 Esteves et al. ............... 370/331

(Continued)

FOREIGN PATENT DOCUMENTS

CN 1443412 A 11/2009

(Continued)

OTHER PUBLICATIONS

Das. A. et al. "Adaptive Link-Level Error recovery Mechanisms in Bluetooth" p. 85-89; Personal Wireless Communications, 2000 IEEE International Conference,Hyderabad, India.*

(Continued)

Primary Examiner—Seema S Rao
Assistant Examiner—Xavier Szewai Wong
(74) Attorney, Agent, or Firm—Myers Bigel Sibley & Sajovec, P.A.

(57) ABSTRACT

A data link, e.g., an audio and/or video data link, is established from a data source, such as an audio and/or video encoder, to a data recipient via an adjustable synchronous radio channel, such as an extended Synchronous Connection-Oriented (eSCO) channel between first and second Bluetooth™ devices. A quality of the data link is determined. A transmission interval and a retransmission criterion of the adjustable synchronous radio channel and an error correction coding of the data link are adjusted responsive to the determined quality of the data link to, for example, maintain a fixed information transfer rate over the data link. The transmission interval and retransmission criterion of the adjustable synchronous radio channel and an error correction coding of the data link may be adjusted by communicating channel parameters between the first and second devices over the radio channel to adjust the transmission interval and the retransmission criterion of the adjustable synchronous radio channel.

18 Claims, 7 Drawing Sheets

U.S. PATENT DOCUMENTS

| | | | |
|---|---|---|---|
| 6,226,290 B1* | 5/2001 | Salett et al. | 370/389 |
| 6,615,382 B1* | 9/2003 | Kang et al. | 714/748 |
| 2002/0085531 A1* | 7/2002 | Herrmann et al. | 370/338 |
| 2002/0136231 A1* | 9/2002 | Leatherbury et al. | 370/442 |
| 2003/0143953 A1* | 7/2003 | Schmandt et al. | 455/41 |
| 2003/0147453 A1* | 8/2003 | Batra | 375/132 |
| 2004/0072582 A1* | 4/2004 | Aljadeff et al. | 455/456.1 |
| 2005/0226198 A1* | 10/2005 | Barak et al. | 370/345 |
| 2006/0048208 A1* | 3/2006 | Sibley et al. | 725/153 |

FOREIGN PATENT DOCUMENTS

| | | |
|---|---|---|
| JP | 2000-209594 | 7/2000 |
| JP | 2000-286991 | 10/2000 |
| JP | 2001-196997 | 7/2001 |
| JP | 2003-259447 | 9/2003 |

OTHER PUBLICATIONS

Palo Wireless "Logical Link Control and Adaptation Protocol (L2CAP)" p. 1-5, dated back to Jan. 28, 2001 (WayBack Machine); retrieved online Dec. 23, 2007, http://www.palowireless.com/infotooth/tutorial/l2cap.asp.*

"Voice over Bluetooth," http://www.eurescom.de/~pub-deliverables/P1100-series/P1118/D3VOICEOverBluetooth.htm, Apr. 28, 2004, 4 pages.

"Specification of the Bluetooth System, Wireless connections made easy," Specification vol. 1, Version 1.2, Nov. 5, 2003, 48 pages.

"Cordless Telephony Profile," Park K:3, Feb. 22, 2001, pp. 100-144.

"Bluetooth Specification, Link Manager Protocol, Procedure Rules," Nov. 5, 2003, pp. 209-284.

"Bluetooth Specification, Baseband Specification, Physical Channels," Nov. 5, 2003, pp. 57-186.

English Translation of First Office Action in corresponding Chinese Patent Application No. 200580023215.4; Nov. 6, 2009 (18 pages).

Office Action in corresponding Japanese Patent Application No. 2007-521450; Jul. 2, 2010 (2 pages).

Bluetooth "Specification of the Bluetooth System" vol. 1 version 1.1 Feb. 22, 2001.

Das et al. "Adaptive Link-Level Error Recovery Mechanisms in Bluetooth" *IEEE International Conference on Personal Wireless Communications* pp. 85-89 (2000).

International Search Report and Written Opinion of the International Searching Authority for International patent application No. PCT/US2005/003935 mailed on Jun. 24, 2005.

Misićet al. "Load and QoS-Adaptive Scheduling in Bluetooth Piconets" *Proceedings of the 37th Hawaii International Conference on System Sciences* pp. 1-8 (2004).

Park et al. "Adaptive Transmission Method for Bluetooth Systems in Noise Environments" *IEEE Student Conference on Research and Development Proceedings* p. 233-236 (2002).

* cited by examiner

APPARATUS, METHODS AND COMPUTER PROGRAM PRODUCTS FOR TRANSMISSION OF DATA OVER AN ADJUSTABLE SYNCHRONOUS RADIO CHANNEL

BACKGROUND OF THE INVENTION

The present invention relates to radio communications, and more particularly, to provision of data links over radio channels.

A relatively fertile area of innovation in wireless communications is the development of applications that utilize radio protocols for unlicensed, ad hoc short range radio communications, such as those specified under the IEEE 802.11 and Bluetooth™ specifications. For example, laptop computers, printers, personal digital assistants (PDAs), cellular handsets, headsets and the like are increasingly being offered with interfaces that allow such devices to create short range radio connections amongst themselves or with network nodes, such as network access points.

Telephony profiles for Bluetooth™ devices have been developed. The Cordless Telephony Profile (CTP) specified by the Bluetooth™ Special Interest Group (SIG), available on the Web at bluetooth.org, utilizes a Bluetooth™ synchronous connection-oriented (SCO) channel to transmit voice data from a vocoder circuit at a fixed rate of 64 kilobits/second. The format of the voice data is either A-law or µ-law pulse code modulation (PCM) or continuous variable-slope delta (CVSD) modulation. The CTP specification also allows for a transparent format whereby some arbitrary coding may be used to generate the 64 kb/s data stream, as the SCO specification does not allow for retransmission. Ericsson's Mobile Services Profile (MSP) uses a Bluetooth™ asynchronous connection-less (ACL) channel with retransmission capability to transmit voice data from a vocoder circuit at a fixed rate of approximately 12.2 kb/s.

SUMMARY OF THE INVENTION

According to some embodiments of the present invention, a data link, e.g., an audio and/or video data link, is established from a data source to a data recipient via an adjustable synchronous radio channel between first and second devices. A quality of the data link is determined. A transmission interval and a retransmission criterion of the adjustable synchronous radio channel and an error correction coding of the data link are adjusted responsive to the determined quality of the data link. For example, the first and second devices may be controllable to adjust the transmission interval and the retransmission criterion of the synchronous radio channel responsive to channel parameters communicated between the first and second devices over a radio channel, and adjusting a transmission interval and a retransmission criterion of the adjustable synchronous radio channel and an error correction coding of the data link responsive to the determined quality of the data link may include communicating channel parameters between the first and second devices over the radio channel to adjust the transmission interval and the retransmission criterion of the adjustable synchronous radio channel.

In some embodiments of the present invention, a quality of transmission of an audio and/or video source over the data link is determined. The transmission interval and the retransmission criterion of the synchronous radio channel and the error correction coding of the audio and/or video source are adjusted responsive to the determined quality of transmission of the audio and/or video source over the data link. For example, the transmission interval and the retransmission criterion of the adjustable synchronous radio channel and the error correction coding of the audio and/or video source may be adjusted while maintaining a fixed coding rate.

In further embodiments of the present invention, a data link between a data source and a data recipient is established via an extended synchronous connection oriented (eSCO) channel between first and second Bluetooth™ devices. A quality of the data link is determined. A transmission interval and a retransmission criterion of the eSCO channel and an error correction coding of the data link are adjusted responsive to the determined quality of the data link. Link management messages may be communicated between the first and second Bluetooth™ devices to adjust the transmission interval and the retransmission criterion of the adjustable synchronous radio channel.

In additional embodiments of the present invention, an apparatus includes a radio communications circuit configured to support a data link over an adjustable synchronous radio channel and operative to adjust a transmission interval and a retransmission criterion of the adjustable synchronous radio channel and an error correction coding of the data link responsive to a quality of the data link. The radio communications circuit may be controllable to adjust the transmission interval and the retransmission criterion of the synchronous radio channel responsive to channel parameters communicated between the radio communications circuit and another radio communications circuit that supports the adjustable synchronous radio channel.

The radio communications circuit may include a radio interface circuit operative transmit data input thereto over the adjustable synchronous radio channel, an adjustable error correction coder operative to provide adjustable error correction coding of the data input to the radio interface circuit, and a control circuit operative to control the radio interface circuit and the adjustable error correction coder responsive to the channel parameters. The radio interface circuit may include a Bluetooth™ controller circuit, and the adjustable synchronous radio channel may include an eSCO channel.

According to further embodiments of the present invention, a computer program product includes computer program code embodied in a computer readable medium. The program code includes program code configured to establish a data link from a data source to a data recipient via an adjustable synchronous radio channel between first and second devices, program code configured to determine a quality of the data link and program code configured to adjust a transmission interval and a retransmission criterion of the adjustable synchronous radio channel and an error correction coding of the data link responsive to the determined quality of the data link. The program code configured to adjust a transmission interval and a retransmission criterion of the adjustable synchronous radio channel and an error correction coding of the data link responsive to the determined quality of the data link may include program code configured to communicate channel parameters between the first and second devices over the radio channel to adjust the transmission interval and the retransmission criterion of the adjustable synchronous radio channel.

DETAILED DESCRIPTION OF EXEMPLARY EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the terms "comprising", "comprises", "includes" and "including" are open-ended, i.e., refer to one or more stated elements, steps and/or functions without precluding one or more unstated elements, steps and/or functions. It will also be understood that the term "and/or" as used herein refers to and encompasses any and all possible combinations of one or more of the associated listed items. It will be further understood that when transfer, communication, or other interaction is described as occurring "between" elements, such transfer, communication or other interaction may be unidirectional and/or bidirectional.

The present invention is described below with reference to block diagrams and/or operational illustrations of methods and wireless terminals according to embodiments of the invention. It will be understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

According to some embodiments of the present invention, electronic apparatus may include a radio communications circuit configured to provide operations described herein. Such apparatus may include any of a number of types of devices, including, but not limited to: cellular handsets; wireless headsets for use with telecommunications devices and/or computers; computers and peripherals that include a radio interface (e.g., Bluetooth™ compliant devices); personal communication terminals that may combine a cellular wireless terminal with data processing, facsimile and data communications capabilities; and personal data assistants (PDA) that can include a wireless transceiver, pager, Internet/intranet access, local area network interface, wide area network interface, Web browser, organizer, and/or calendar.

Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

Figure 1:
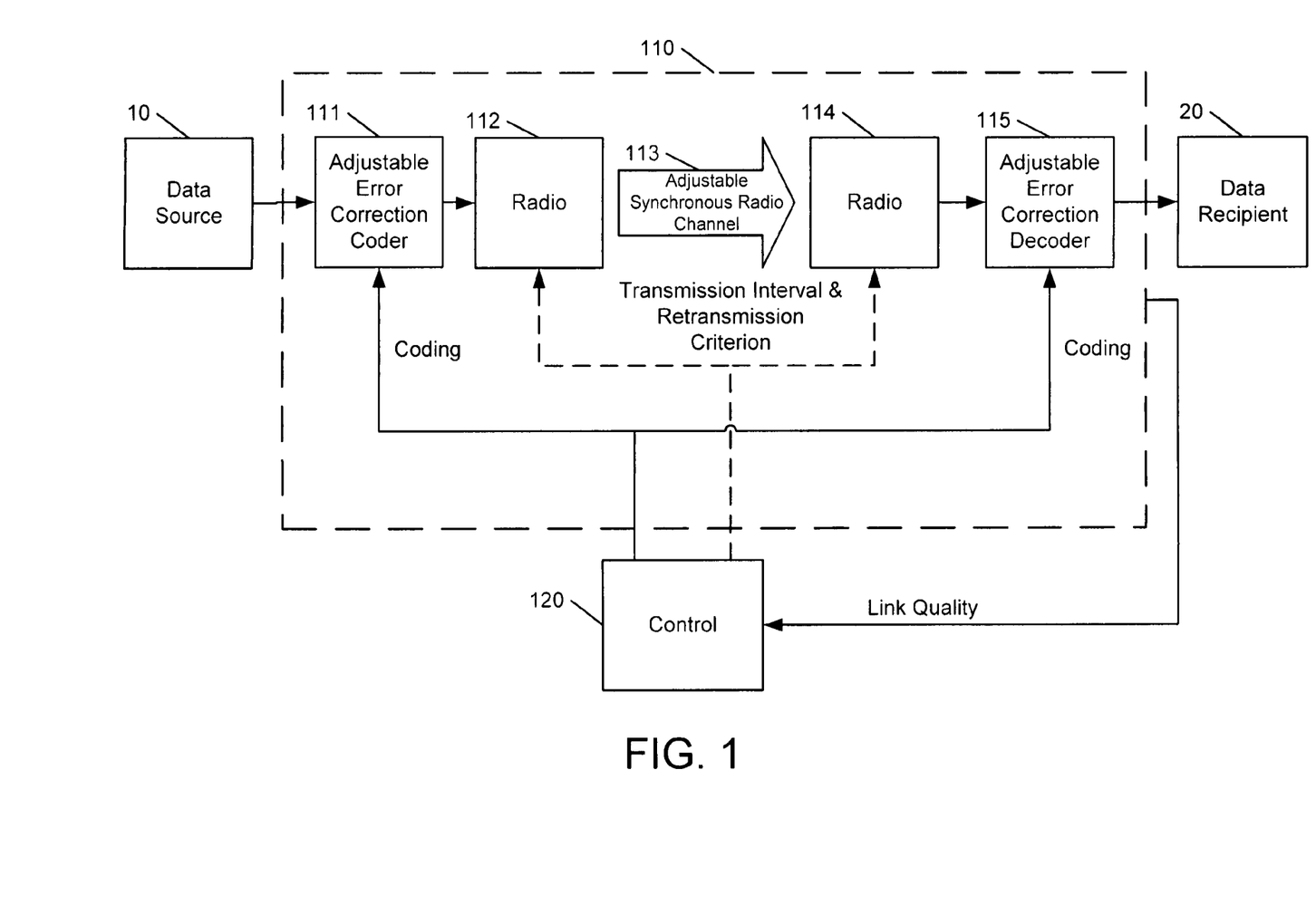
FIG. 1 illustrates communications apparatus and operations according to some embodiments of the present invention.

FIG. 1 illustrates apparatus and operations according to some embodiments of the present invention. Data produced from a data source 10, such as an audio and/or video data source, is communicated to a data recipient 20, such as an audio or video reproduction circuit, over a data link 110. The data is transferred over the data link 110 via an adjustable synchronous radio channel 113 that is supported by first and second radio circuits 112, 114. The adjustable synchronous radio channel 113 has an adjustable transmission interval (e.g., the interval between transmission of packets over the radio channel 113) and an adjustable retransmission criterion (e.g., a maximum number of retransmissions per packet transmitted over the radio channel 113). The data link 110 further includes adjustable error correction coder and decoder circuits 111, 115 coupled to respective ends of the adjustable synchronous radio channel 113. A control circuit 120 adjusts the coding rate of the error correction coder and decoder circuits 111, 115 and the transmission interval and retransmission criterion of the radio channel 113, e.g., by controlling one or both of the radio circuits 112, 114, responsive to a quality of the data link 110. For example, the control circuit 140 may adjust transmission interval, retransmission and/or coding rate based on error detection decoding of the data transmitted over the data link 110, error correction decoding metrics produced by the error correction decoder circuit 115, a number of retransmissions over the radio channel 113 and/or any of a number of other measures of link quality.

Figure 2:
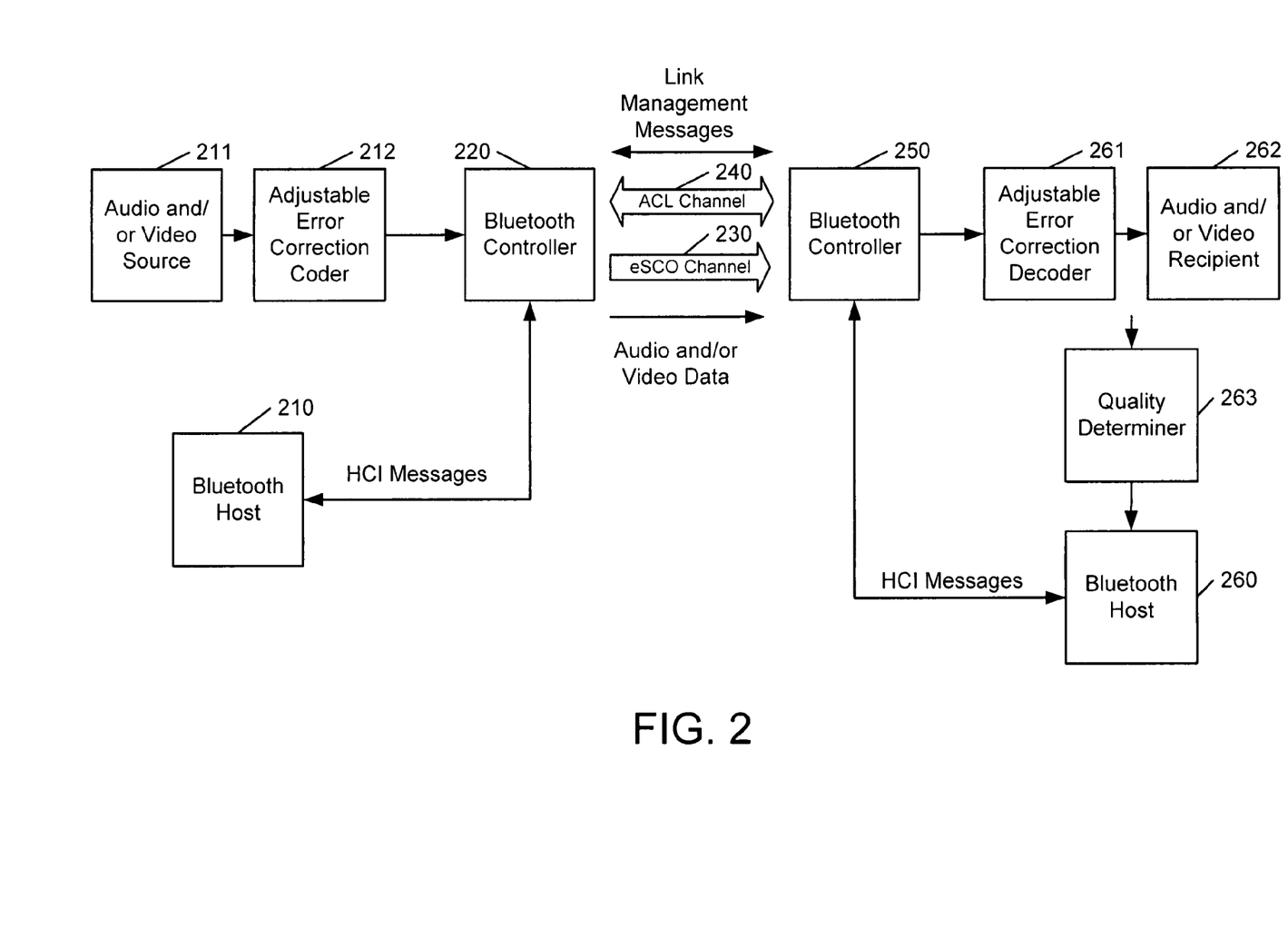
FIGS. 2-5 are schematic diagrams illustrating Bluetooth™ communications apparatus and operations according to various embodiments of the present invention.

FIG. 2 illustrates an exemplary configuration of a data link between an audio and/or video data source 211 and an audio and/or video data recipient 262 using an ad hoc Bluetooth™ adjustable synchronous radio connection according to further embodiments of the present invention. In the illustrated embodiments, the audio and/or video data source 211 are coupled to an adjustable error correction coder circuit 212 configured to adjustably encode data from the data source 211. It will be appreciated that, in some embodiments, the adjustable error correction coder circuit may be adjustable to provide no additional error correction coding. Data produced from the adjustable error correction coder circuit 212 is provided to a first Bluetooth™ controller circuit 220 that is operatively associated with a first Bluetooth™ host 210 and that supports an extended Synchronous Connection-Oriented (eSCO) radio channel 230 to a second Bluetooth™ controller circuit 250. The second Bluetooth™ controller circuit 250 is coupled to a second Bluetooth™ host 260 and to a complementary adjustable error detection decoder circuit 261 and the audio and/or video data recipient 262.

A transmission interval and a retransmission limit of the eSCO channel 230 is adjusted by link management parameters included in messages between the first and second Bluetooth™ controller circuits 220, 250 over an Asynchronous Connection-Less (ACL) channel 240. Such link management parameters are described in *Specification of the Bluetooth System*, Version 1.2 (November 2003), published by the Bluetooth™ Special Interest Group and available on the Web at bluetooth.org. Control circuitry in or associated with the first Bluetooth™ host 210 and/or the second Bluetooth™ host 260 determines a quality of the link between the data source 211 and the data recipient 262 and responsively controls the transmission of such parameters. For example, as shown in FIG. 2, the receiving Bluetooth™ host 260 may be responsive to a quality determiner circuit 263 that, for example, monitors error correction and/or detection metrics for the data link. The Bluetooth™ host 260 may include control circuitry that, responsive to the determined quality, provides appropriate Host Command Interface (HCI) messages that cause transmission of appropriate link management messages from the second Bluetooth™ controller circuit 250 to the first Bluetooth™ controller circuit 220 over the ACL channel 240 and/or the eSCO channel 230, which, in turn, causes transmission of appropriate HCI messages between the first Bluetooth™ controller circuit 220 and the first Bluetooth™ host 210 to adjust the transmission interval and/or retransmission limit of the eSCO channel 230 and/or the error correction coding applied by the adjustable error correction coder circuit 212 and the adjustable error correction decoder circuit 261 to maintain, for example, a minimum or substantially fixed transfer rate between the data source 211 and the data recipient 262 while maintaining a predetermined link quality. It will be appreciated, however, that quality determination and control of the eSCO channel 230 may be provided in a number of different ways. For example, a link quality determiner may be integrated into a Bluetooth™ controller circuit and/or a Bluetooth™ host circuit.

Figure 3:
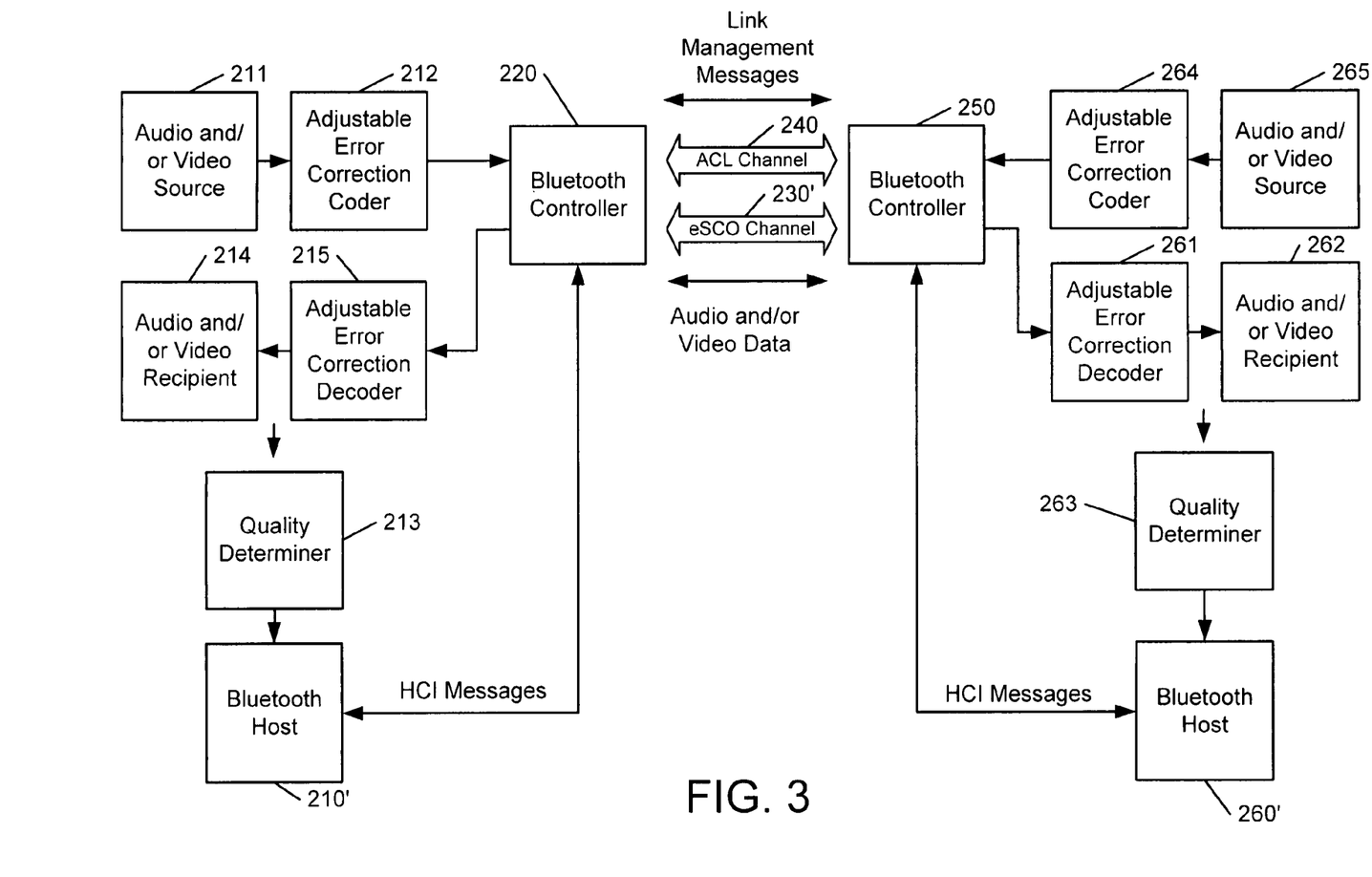

FIG. 3 illustrates a modification of the circuitry and operations illustrated in FIG. 2 to provide bidirectional communications. Like components of FIGS. 2 and 3 are indicated by like numerals, and further description of these like components will not be provided in lieu of the foregoing description of FIG. 2. In the illustrated embodiments of FIG. 3, a first Bluetooth™ host 210' is coupled to a first Bluetooth™ controller circuit 220 that is coupled to an audio and/or video recipient 214 that receives audio and/or video data from an audio and/or video data source 265 associated with a second Bluetooth™ host 260'. An adjustable error correction coder circuit 264 adjustably error correction codes the output of the data source 265 and provides the data to a second Bluetooth™ controller circuit 250 for transmission to the first Bluetooth™ controller circuit 220 over an eSCO channel 230'. An adjustable error correction decoder circuit 215 receives the data from the first Bluetooth™ controller circuit 220 and provides data to the audio and/or video recipient 214. The first Bluetooth™ host 210' is responsive to a link quality determiner circuit 213 that determines quality of the link between the audio and/or video data source 265 and the audio and/or video data recipient 214. Along lines described above with reference to FIG. 2, the first Bluetooth™ host 210' and/or the second Bluetooth™ host 260' may adjust the transmission interval and/or the retransmission limit of the eSCO channel 230' and/or the coding of the error correction coder circuit 264 and the error correction decoder circuit 215 responsive to the determined quality.

It will be appreciated that the bidirectional communications illustrated in FIG. 3 need not be symmetrical. In particular, the eSCO channel 230' may provide different rates and/or different coding, transmission interval and retransmission criteria in different directions.

Figure 4:
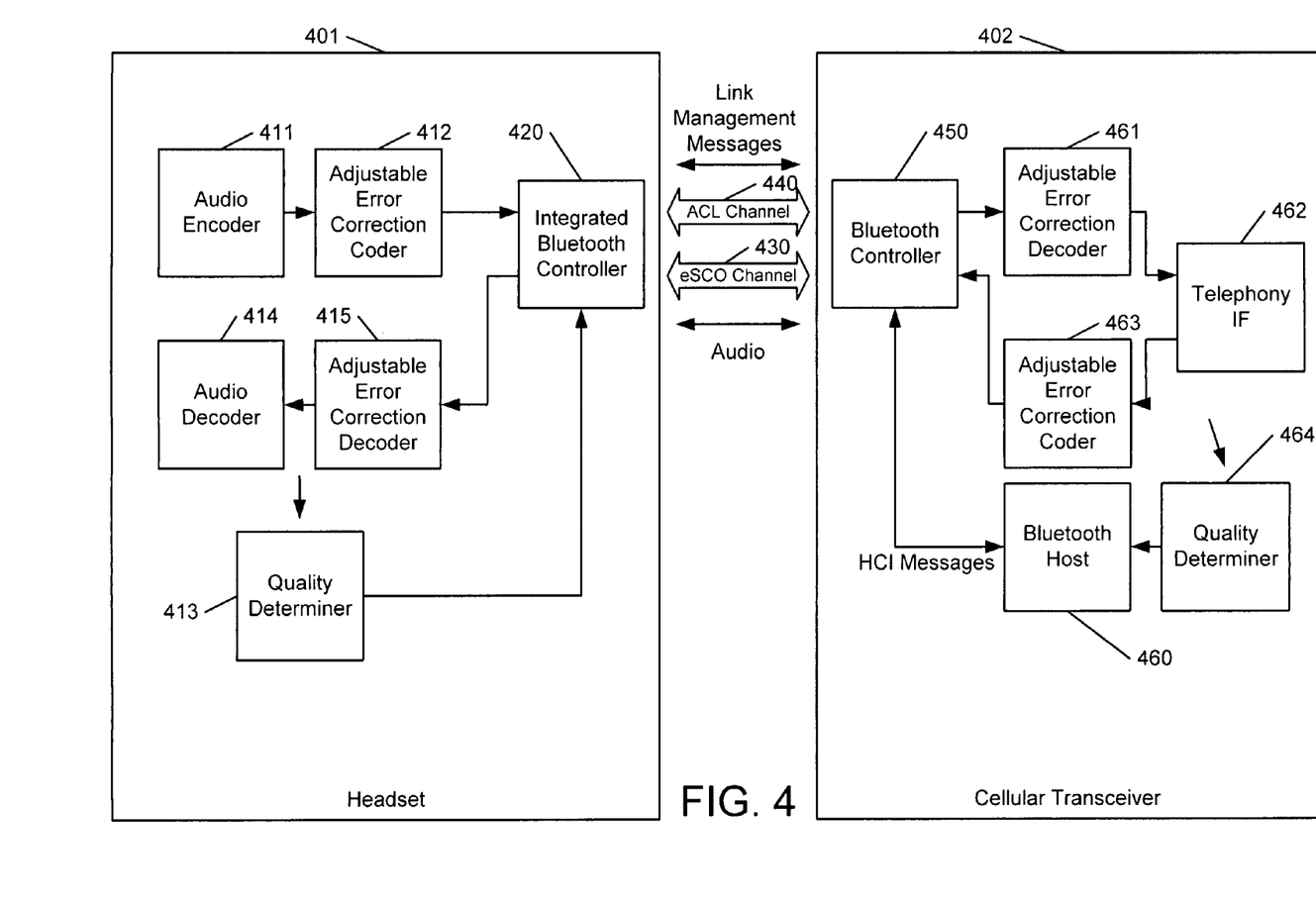
Figure 5:
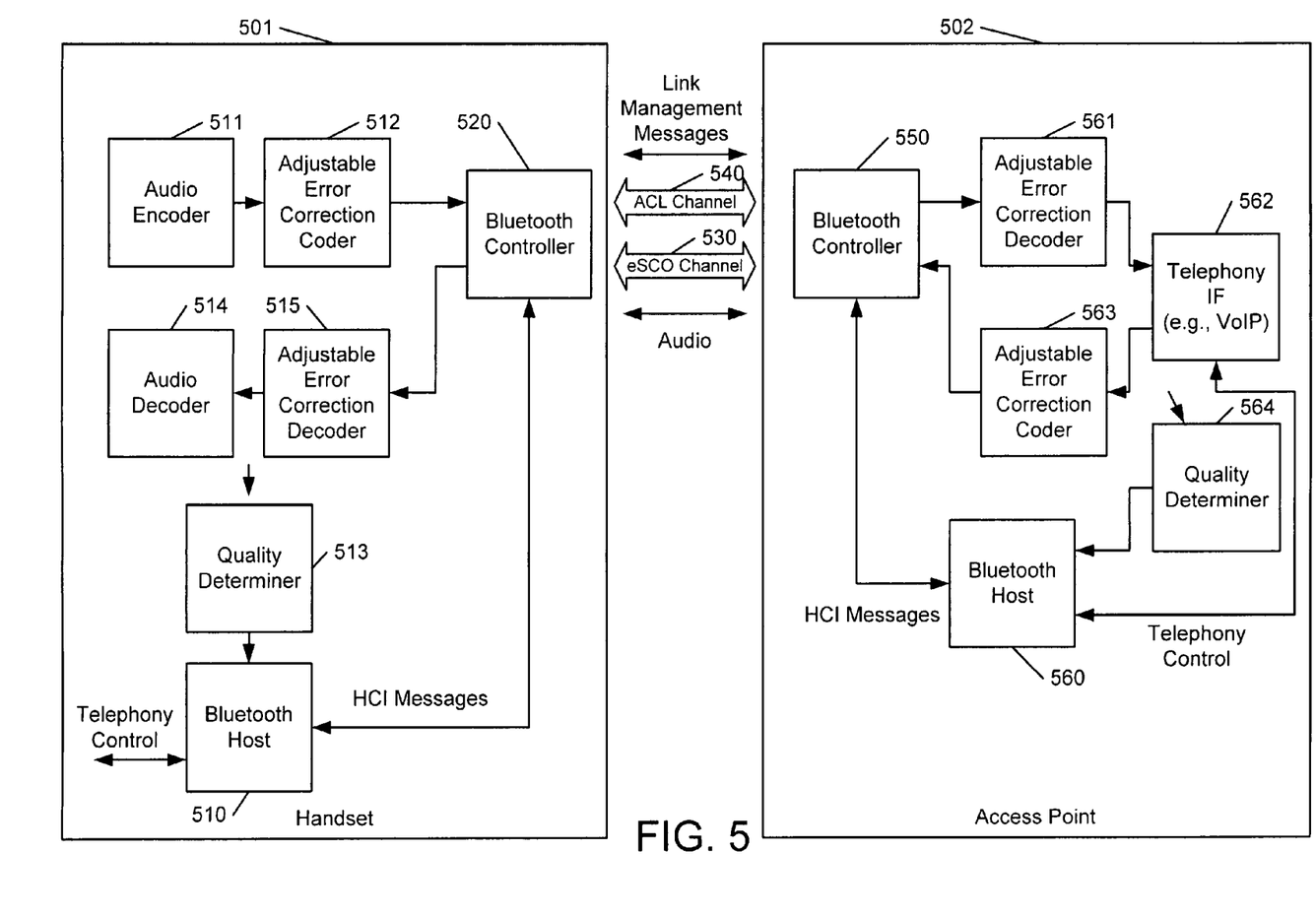

FIGS. 4 and 5 illustrate exemplary application environments in which a structure along the lines illustrated in FIG. 3 may be used. Referring to FIG. 4, a headset 401 includes an integrated Bluetooth™ controller circuit 420, i.e., a Bluetooth™ controller that implements upper-level protocol and profile layers without a host interface. The integrated Bluetooth™ controller circuit 420 is operatively associated with a data source in the form of an audio encoder circuit 411, which produces audio data from an audio source, such as a microphone (not shown) of the headset 401. An adjustable error correction coder circuit 412 receives audio data from the audio encoder circuit 411 and provides adjustable error correction coding (which may include an option of providing no error correction coding) of the received data for provision to the integrated Bluetooth™ controller circuit 420.

The integrated Bluetooth™ controller circuit 420 transmits the audio data over an eSCO channel 430 to a Bluetooth™ controller circuit 450 in a cellular transceiver unit 402 (e.g., a mobile handset or fixed cellular radiotelephone), with the eSCO channel being controlled by link management parameters communicated over an ACL channel 440. The cellular transceiver unit 402 further includes a Bluetooth™ host circuit 460 that is coupled to the Bluetooth™ controller circuit 450 and operatively associated with an adjustable error correction decoder circuit 461 for adjustably error correction decoding audio data received by the Bluetooth™ controller circuit 450, and a telephony interface circuit 462 that receives data from the adjustable error correction decoder circuit 450. A link quality determiner circuit 464 determines quality of data transferred over the data link between the audio encoder circuit 411 and the telephony interface circuit 462.

The telephony interface circuit 462 is further operative to provide audio data to an adjustable error correction decoder circuit 463, which adjustably error correction codes the data for transmission over the eSCO channel 430 by the Bluetooth™ controller circuit 450. The transmitted data is received by the integrated Bluetooth™ controller circuit 420 and passed to a complementary adjustable error correction decoder circuit 415. Audio data is provided from the error correction decoder circuit 415 to an audio decoder circuit 414 for use, for example, in driving a speaker (not shown) of the headset 401. A link quality determiner circuit 423 determines a link quality of the link between the telephony interface circuit 462 and the audio decoder circuit 414.

FIG. 5 illustrates another exemplary application, in particular, a configuration that uses an adjustable synchronous Bluetooth™ radio channel to communicate audio data from a cellular handset 501 to a network access point 502, for example, a node of an Internet Protocol (IP) network, such that the handset 501 may be used, for example, for voice over IP (VoIP) communications via the IP network. The handset 501 includes a first Bluetooth™ host 510 and a first Bluetooth™ controller circuit 520. A data source in the form of an audio encoder circuit 511 produces audio data from an audio source, such as a microphone (not shown) of the handset 501. An adjustable error correction coder circuit 512 receives audio data from the audio encoder circuit 511 and provides adjustable error correction coding (which may include no error correction coding) of the received data for provision to the first Bluetooth™ controller circuit 520. The Bluetooth™ host circuit 510 receives control information and conveys it to the Bluetooth™ controller circuit 520.

The first Bluetooth™ controller circuit 520 transmits the audio data over an eSCO channel 530 to a second Bluetooth™ controller circuit 550 in the access point 502, with the eSCO channel being controlled by link management parameters communicated over an ACL channel 540 between the first and second Bluetooth™ controller circuits 520, 550. The access point 502 further includes a second Bluetooth™ host circuit 560 that is coupled to the second Bluetooth™ controller circuit 550. An adjustable error correction decoder circuit 461 adjustably error correction decodes audio data received by the second Bluetooth™ controller circuit 550, and a telephony interface circuit 562 receives data from the adjustable error correction decoder circuit 550. A link quality determiner circuit 564 determines quality of data transferred over the data link between the audio encoder circuit 511 and the telephony interface circuit 562.

The telephony interface circuit 562 is further operative to provide audio data to an adjustable error correction decoder circuit 563, which adjustably error correction codes the data for transmission over the eSCO channel 530 by the second Bluetooth™ controller circuit 550. The transmitted data is received by the first Bluetooth™ controller circuit 520 and passed to a complementary adjustable error correction decoder circuit 515. Audio data, suitably decoded, is provided from the adjustable error correction decoder circuit 515 to an audio decoder circuit 514 for use, for example, in driving a speaker (not shown) of the handset 501. A link quality determiner circuit 513 determines a link quality of the link between the telephony interface circuit 562 and the audio decoder circuit 514. Telephony control information is also exchanged between the Bluetooth™ host circuits 510, 560 via the ACL channel 540.

As specified by release 1.2 of the Bluetooth™ core specification, an eSCO channel includes adjustable retransmission and adjustable transmission interval parameters. In particular, the number of transmission slots that occur between packet transmissions on an eSCO channel is adjustable, and the number of maximum ARQ retransmissions for a single packet can be adjusted to various values, including zero.

In some embodiments of the present invention, a vocoder circuit (e.g., a GSM vocoder) operating at a fixed rate (e.g., 10.2 kb/s) may be coded to generate voice packets that fit within the payload of one eSCO frame (204 bits or 26 bytes). These packets are may be fed into an eSCO channel. Error correction coding of the vocoder output and the transmission interval and retransmission limit of the eSCO channel can be varied responsive to link quality to maintain a fixed rate of transfer of the vocoder output over the link. In this manner, an adaptive Bluetooth™ channel can be used to couple a device having such a vocoder, such as a cellular handset, to a network access point such that the device can also be used for telephony over a network linked to the access point.

Figure 6:
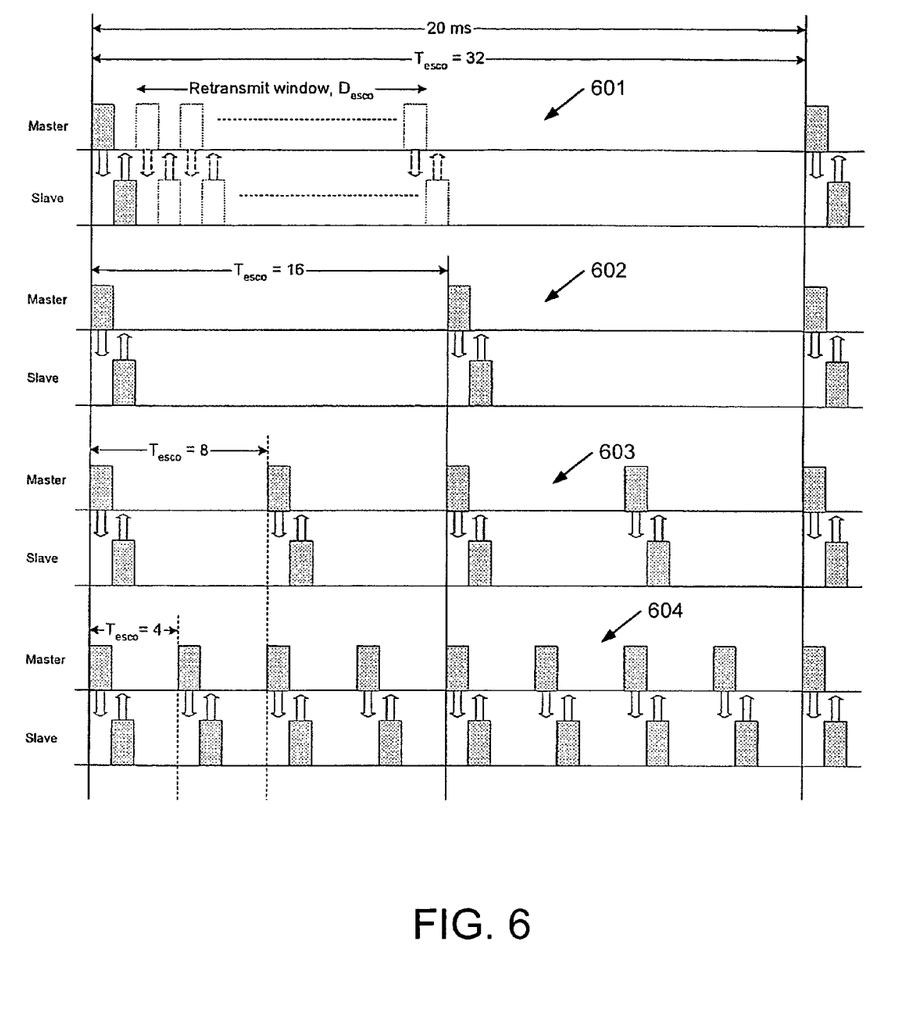
FIG. 6 is a timing diagram illustrating various communications modes of Bluetooth™ master and slave nodes according to some embodiments of the present invention.

FIG. 6 illustrates four operational modes 601, 602, 603, 604 for such a link. In a first mode 601, only a single voice packet (per direction) is transmitted for each 20-ms voice frame, without error correction coding. Such a mode may be used, for example, in optimal channel conditions. Lost packets may be retransmitted using an Automatic Repeat Request (ARQ) technique. As channel quality decreases, the system may transition to a second mode 602, which uses rate ½ error correction coding (e.g., convolutional coding) to generate two packets per 20 ms frame. The second mode 602 may eliminate retransmission, or may limit transmission to a single retransmission. The third and fourth modes 603, 604 add repeat coding to the ½ rate coded bits (without retransmission) to increase robustness in poorer channel conditions. FIG. 6 illustrates exemplary values of the Bluetooth™ transmission interval parameter $T_{esco}$ and retransmit window $D_{esco}$ for the various modes 601, 602, 603, 604, while Table I illustrates values for negotiable sSCO link parameters for the modes 601, 602, 603, 604:

TABLE I

| Rate (normalized) | Transmit Interval $T_{esco}$ | Retransmit Window $D_{esco}$ | Packet Type | Air Mode | Packet Length (bytes) |
|---|---|---|---|---|---|
| 1 | 32 | 2-30 | EV3 | Transparent | 26 |
| 1/2 | 16 | 0 | EV3 | Transparent | 26 |
| | | (or 2) | | | |
| 1/4 | 8 | 0 | EV3 | Transparent | 26 |
| 1/8 | 4 | 0 | EV3 | Transparent | 26 |

Figure 7:
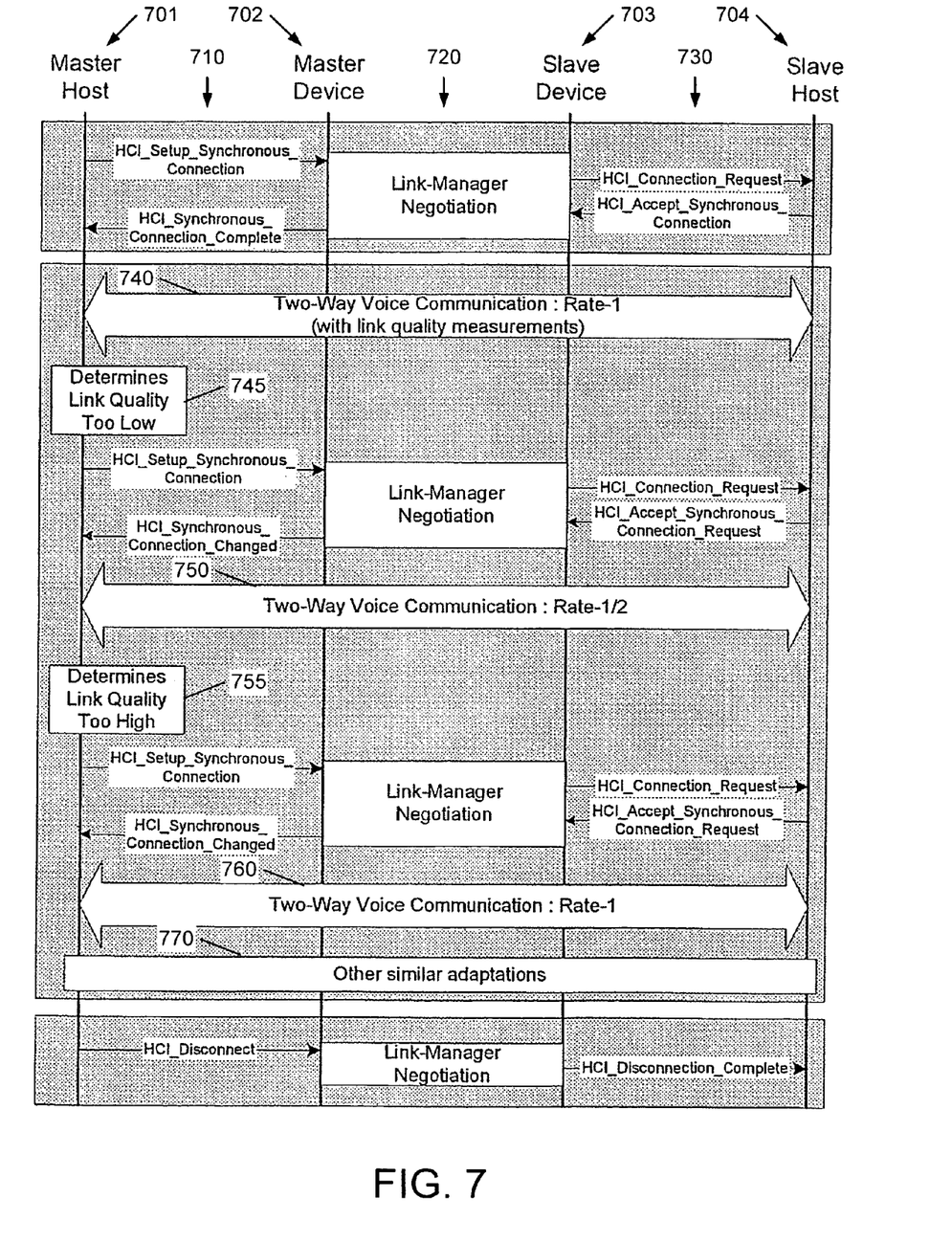
FIG. 7 is a diagram illustrating exemplary Bluetooth™ master/slave wireless communications according to further embodiments of the present invention.

FIG. 7 illustrates exemplary phases of operation of such a link in a telephony application. In FIG. 7, a master entity includes a master host 701 and a master Bluetooth™ device (e.g., controller) 702, and a slave entity includes a slave host 704 and a slave Bluetooth™ device (e.g., controller) 703. Each host/device pair 701/702, 704/703 communicates using Bluetooth™ HCI messages 710, 730, and the devices 702, 703 communicate using Link Management Protocol (LMP) negotiation messages 720. The hosts include the telephony application and layers of the Bluetooth™ stack above HCI, while the devices include the Bluetooth™ Link Management (LM), baseband (BB), and physical layers below the HCI.

The master host 701 requests establishment of the connection with an HCI_Setup_Synchronous_Connection message that includes appropriate eSCO channel parameters. After appropriate negotiation between the master device 702 and the slave device 703 and between the slave device 703 and the slave host 704 (i.e., an HCI_Connection_Request message followed by a responsive HCI_Accept Synchronous_Connection message), the master host 701 receives indication of establishment of the eSCO link in an HCI_Synchronous_Connection_Complete message. A first phase 740 of two-way communication over the eSCO link, e.g., a Rate 1 exchange, then may commence.

Upon determination by the master host 701 that link quality is unacceptable at 745, the master host 701 initiates a renegotiation of the eSCO link parameters, ultimately leading to a second phase of operation 750 at rate ½. Upon determining that link quality has sufficiently improved at 755, the master host 701 renegotiates the link parameters, leading to a third phase of operation 760 at rate 1. Similar adaptations 770 may subsequently occur. At some subsequent time, the master host 701 initiates termination of the channel with an HCI_Disconnect message.

The exemplary operations shown in FIG. 7 are for a configuration in which the master host 701 controls communications in both directions. In other embodiments of the present invention, a slave host, such as the slave host 704, could also request changes in channel criteria, in either direction.

The flow diagrams and block diagrams of FIGS. 1-7 illustrate architecture, functionality, and operations of possible implementations of apparatus, methods and computer program products (embodied as non-transitory computer readable media) according to various embodiments of the present invention. It should also be noted that, in some alternative implementations, the acts noted in the diagrams may occur out of the order noted in the figures. For example, two operations shown in succession may, in fact, be executed substantially concurrently, or the operations may sometimes be executed in the reverse order, depending upon the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed:

1. A communications method comprising;
   establishing a data link between a data source and a data recipient via an extended synchronous connection oriented (eSCO) channel between first and second Bluetooth™ devices;
   determining a quality of the data link, wherein determining a quality of the data link comprises determining a quality of transmission of an audio and/or video source over the data link; and
   adjusting a transmission interval and a retransmission criterion of the eSCO channel and an error correction coding of the data link responsive to the determined quality of the data link, wherein adjusting a transmission interval and a retransmission criterion of the eSCO channel and an error correction coding of the data link responsive to the determined quality of the data source comprises adjusting the transmission interval and the retransmission criterion of the eSCO channel and the error correction coding of the audio and/or video source responsive to the determined quality of transmission of the audio and/or video source over the data link, wherein the audio and/or video source comprises a vocoder and wherein adjusting the transmission interval and the retransmission criterion of the eSCO channel and the error correction coding of the audio and/or video source responsive to the determined quality of transmission of the audio and/or video source over the data link comprises adjusting the transmission interval and the retransmission criterion of the eSCO channel and an error correction coding applied to an output of the vocoder while maintaining a fixed rate of data transfer of the output of the vocoder to the data recipient.

2. The method according to claim 1, wherein one of the first and second Bluetooth™ devices comprises a wireless network access point.

3. The method according to claim 1, wherein adjusting a transmission interval and a retransmission criterion of the eSCO channel and an error correction coding of the data link responsive to the determined quality of the data link comprises:
   changing the retransmission criterion from disabling retransmission to allowing retransmission; or
   changing the error correction coding from providing no error correction coding of the data link to providing error correction coding of the data link.

4. A communications method comprising:
   establishing a data link from a data source to a data recipient via an adjustable synchronous radio channel between first and second devices;
   determining a quality of the data link, wherein determining a quality of the data link comprises determining a quality of transmission of an audio and/or video source over the data link; and
   maintaining a fixed rate of data transfer from the data source to the data recipient over a range of radio channel conditions by varying a transmission interval and a retransmission criterion of the adjustable synchronous radio channel and an error correction coding of the data link responsive to the determined quality of the data link, wherein varying a transmission interval and a retransmission criterion of the adjustable synchronous radio channel and an error correction coding of the data link responsive to the determined quality of the data link comprises varying the transmission interval and the retransmission criterion of the synchronous radio channel and the error correction coding of the audio and/or video source responsive to the determined quality of transmission of the audio and/or video source over the data link, wherein the audio and/or video source comprises a vocoder and wherein varying the transmission interval and the retransmission criterion of the adjustable synchronous radio channel and the error correction coding of the audio and/or video source responsive to the determined quality of transmission of the audio and/or video source over the data link comprises varying the transmission interval and the retransmission criterion of the adjustable synchronous radio channel and an error correction coding of applied to an output of the vocoder while maintaining a fixed rate of data transfer of the output of the vocoder to the data recipient.

5. The method according to claim 4, wherein the first and second devices are controllable to adjust the transmission interval and the retransmission criterion of the synchronous radio channel responsive to channel parameters communicated between the first and second devices over a radio channel, and wherein varying a transmission interval and a retransmission criterion of the adjustable synchronous radio channel and an error correction coding of the data link responsive to the determined quality of the data link comprises communicating channel parameters between the first and second devices over the radio channel to adjust the transmission interval and the retransmission criterion of the adjustable synchronous radio channel.

6. The method according to claim 4, wherein the first and second devices comprise respective nodes in an ad hoc radio network.

7. The method according to claim 4, wherein one of the first and second devices comprises a wireless network access point.

8. The method according to claim 4, wherein varying a transmission interval and a retransmission criterion of the adjustable synchronous radio channel and an error correction coding of the data link responsive to the determined quality of the data link comprises:
   changing the retransmission criterion from disabling retransmission to allowing retransmission; or
   changing the error correction coding from providing no error correction coding of the data link to providing error correction coding of the data link.

9. The method according to claim 1, wherein adjusting a transmission interval and a retransmission criterion of the adjustable synchronous radio channel and an error correction coding of the data link responsive to the determined quality of the data link comprises communicating link management messages between the first and second Bluetooth™ devices to adjust the transmission interval and the retransmission criterion of the adjustable synchronous radio channel.

10. An apparatus comprising:
   a radio communications circuit configured to support a data link over an adjustable synchronous radio channel and operative to maintain a fixed rate of data transfer from the data source to a data recipient via the data link over a range of radio channel conditions by varying a transmission interval and a retransmission criterion of the adjustable synchronous radio channel and an error correction coding of the data link responsive to a quality of the data link; and
   an audio and/or video encoder that provides data to the data link supported by the radio communications circuit, wherein the audio and/or video encoder comprises a vocoder and wherein the radio communications circuit is operative to vary the transmission interval and the retransmission criterion of the adjustable synchronous radio channel and the error correction coding of the data link while a rate of data transfer from the vocoder to the data recipient remains fixed.

11. The apparatus according to claim 10, wherein the radio communications circuit is controllable to adjust the transmission interval and the retransmission criterion of the synchronous radio channel responsive to channel parameters communicated between the radio communications circuit and another radio communications circuit that supports the adjustable synchronous radio channel.

12. The apparatus according to claim 11, wherein the radio communications circuit comprises:
a radio interface circuit operative to transmit data input thereto over the adjustable synchronous radio channel;
an adjustable error correction coder operative to provide adjustable error correction coding of the data input to the radio interface circuit; and
a control circuit operative to control the radio interface circuit and the adjustable error correction coder responsive to the channel parameters.

13. The apparatus according to claim 12:
wherein the radio interface circuit comprises a Bluetooth™ controller circuit; and
wherein the adjustable synchronous radio channel comprises an eSCO channel.

14. The apparatus according to claim 10, incorporated in a wireless network access point or an ad hoc radio node.

15. A communications apparatus comprising:
means for establishing a data link between a vocoder and a data recipient via an adjustable synchronous radio channel;
means for determining a quality of transmission of the vocoder over the data link; and
means for maintaining a fixed rate of data transfer from the vocoder to the data recipient via the data link over a range of radio channel conditions by varying a transmission interval and a retransmission criterion of the adjustable synchronous radio channel and an error correction coding applied to an output of the vocoder responsive to the determined quality of transmission of the vocoder over the data link, wherein the means for maintaining a fixed rate of data transfer from the vocoder to the data recipient via the data link over a range of radio channel conditions by varying a transmission interval and a retransmission criterion of the adjustable synchronous radio channel and an error correction coding applied to an output of the vocoder responsive to the determined quality of transmission of the vocoder over the data link comprises means for communicating channel parameters between the first and second devices over the radio channel to adjust the transmission interval and the retransmission criterion of the adjustable synchronous radio channel.

16. An apparatus according to claim 15, wherein the adjustable synchronous radio channel comprises a Bluetooth™ eSCO channel.

17. A non-transitory computer readable medium encoded with computer program code executable on a computer, the program code comprising:
program code configured to establish a data link from a vocoder to a data recipient via an adjustable synchronous radio channel between first and second devices;
program code configured to determine a quality of transmission of the vocoder over the data link; and
program code configured to maintain a fixed rate of data transfer from the vocoder to the data recipient over a range of radio channel conditions by varying a transmission interval and a retransmission criterion of the adjustable synchronous radio channel and an error correction coding applied to an output of the vocoder responsive to the determined quality of transmission of the vocoder over the data link, wherein the program code configured to maintain a fixed rate of data transfer from the vocoder to the data recipient over a range of radio channel conditions by varying a transmission interval and a retransmission criterion of the adjustable synchronous radio channel and an error correction coding applied to an output of the vocoder responsive to the determined quality of transmission of the vocoder over the data link comprises program code configured to communicate channel parameters between the first and second devices over the radio channel to adjust the transmission interval and the retransmission criterion of the adjustable synchronous radio channel.

18. The computer readable medium according to claim 17, wherein the adjustable synchronous radio channel comprises a Bluetooth™ eSCO channel.

* * * * *